United States Patent
Stager

(10) Patent No.: US 10,676,959 B2
(45) Date of Patent: Jun. 9, 2020

(54) NETTING POST CAP

(71) Applicant: Mark Phillip Stager, Boring, OR (US)

(72) Inventor: Mark Phillip Stager, Boring, OR (US)

( * ) Notice: Subject to any disclaimer, the term of this patent is extended or adjusted under 35 U.S.C. 154(b) by 0 days.

(21) Appl. No.: 16/000,177

(22) Filed: Jun. 5, 2018

(65) Prior Publication Data

US 2019/0368221 A1 Dec. 5, 2019

(51) Int. Cl.
| F16M 11/00 | (2006.01) |
| E04H 17/24 | (2006.01) |
| A01M 29/32 | (2011.01) |
| E04H 17/20 | (2006.01) |
| E04H 17/00 | (2006.01) |

(52) U.S. Cl.
CPC ............. *E04H 17/24* (2013.01); *A01M 29/32* (2013.01); *E04H 17/20* (2013.01); *E04H 2017/006* (2013.01)

(58) Field of Classification Search
CPC .. H01R 4/5091; H02G 15/043; A63B 1/0054; A63B 5/11
See application file for complete search history.

(56) References Cited

U.S. PATENT DOCUMENTS

| 2,681,822 | A | * | 6/1954 | Daniels | H01K 3/32 |
| | | | | | 81/53.11 |
| 3,349,532 | A | | 10/1967 | Dudoff | |
| 3,395,382 | A | * | 7/1968 | Weagant | H01R 4/5091 |
| | | | | | 174/72 R |
| 5,499,737 | A | | 3/1996 | Kraus | |
| 6,261,207 | B1 | * | 7/2001 | Publicover | A63B 5/11 |
| | | | | | 482/27 |
| 6,745,530 | B2 | * | 6/2004 | Nesbitt | E04H 17/20 |
| | | | | | 52/300 |
| 8,100,813 | B2 | * | 1/2012 | Publicover | A63B 5/11 |
| | | | | | 482/27 |
| 9,224,524 | B2 | * | 12/2015 | Franke | H02G 15/043 |
| 10,076,697 | B1 | * | 9/2018 | Publicover | A63B 71/0054 |
| 2008/0009394 | A1 | * | 1/2008 | VanElverdinghe | A63B 5/11 |
| | | | | | 482/29 |
| 2008/0269021 | A1 | * | 10/2008 | Publicover | A63B 5/11 |
| | | | | | 482/29 |

OTHER PUBLICATIONS

Amazon.com, "Amazon.com Post Caps," at least as early as May 27, 2019, © 1996-2019, Amazon.com, Inc. Or its affiliates, 9 pages.
(Continued)

*Primary Examiner* — Amy J. Sterling
(74) *Attorney, Agent, or Firm* — Green, Howard & Mughal, LLP; Karen Dana Oster

(57) ABSTRACT

A netting post cap 11 is provided for fitting over the top of a post. Posts are often used for fences to protect animals and agriculture. In certain cases, netting is used for additional protection from animals and agriculture. Wires can be strung between posts on the top of the netting post caps. Netting can be supported over the wires and netting post caps 11. The netting post cap 11 generally has a domed head 12 and a stem 14. The stem 14 may connect the dome 12 with struts 13 for structural support and aid in tying off wire ends. Holes 15 in the dome 12 are used to thread wire through and tie off wire ends. Protrusions 17 rising from the dome 12 secure the netting into position and protect the netting.

24 Claims, 2 Drawing Sheets

(56) References Cited

OTHER PUBLICATIONS

Gourock.com, "Steel Pole Deer Netting Install using T-Posts," at least as early as May 27, 2019, © 1997-2019 Gourock Inc., All Rights Reserved, 4 pages.
Suwak, Matt, "DIY Guide: How to Install a Deer Fence to Keep Wildlife Out of the Garden," at least as early as May 27, 2019, © Ask the Exerts, LLC, All Rights Reserved, 16 pages.

* cited by examiner

NETTING POST CAP

CROSS-REFERENCE TO RELATED APPLICATIONS

Not applicable

BACKGROUND OF THE INVENTION

The present invention relates to a netting post cap that is mounted on a livestock, gardening, or agricultural fence post, the netting post cap is used to secure and support netting.

In protecting small animals from birds of prey or for protecting crops from hungry birds, netting can be used as a barrier. Securing and supporting the netting often involves using custom fixturing, hooks, and wires between building structures or posts. The difficulty with placing netting on top of posts is that netting can easily shift in the wind to snag and tear on the end of the post. Alternatively, the mesh of the netting can exceed the cross-sectional dimension of the post and simply slip down the post if not secured to the post. Currently, there is no agricultural or gardening fence post cap on the market that is used specifically for securing and supporting netting. There are post caps on the market that are fitted inside hollow posts, locked in place with a smooth dome to protect the netting but does not secure the netting in place or support wires between posts. There is also an active market for post caps used for supporting electric fencing and isolating the electrical current from the fence post, but that cap is not designed to secure netting or to support wire in multiple axes needed to adequately support bird netting.

BRIEF SUMMARY OF THE INVENTION

In order to protect chickens from predator birds or animals that can jump fences, bird netting and supporting wires can be mounted between fence posts and secured in place by this netting post cap, which is mounted on the top of a standard fencing post.

In order to keep birds from eating ripened berries or newly planted garden plants, bird netting and supporting wires can be mounted between fence posts and secured in place by this netting post cap, which is mounted on the top of the garden fencing post.

This invention is a netting post cap that slips over the top of a post and sits on the top of the post. When placed on the top of a post, the netting post cap may be rotated to a preferred horizontal orientation. Wire used to hold up netting between posts can then be strung between posts, pulled to a preferred tension, and held in place by protrusions above the dome of the cap. The ends of wire strung between posts can be threaded through eyelets in the dome of the netting post cap and then bent or wrapped around the posts and knotted, locking the wires into position. Netting can then be placed on top of the cap, hanging over the wire between posts and similarly held in place by the same protrusions above the dome of the netting post cap. Finally, additional wire can then be inserted through the eyelets in the dome of the netting post cap to secure the netting in place.

It is the object of this invention to overcome one or more of the previously described problems by providing an alternative netting post cap.

This invention is intended to simplify the installation of overhanging netting, secure netting into a fixed location, and may allow up to 360 degree horizontal orientation of netting, and protect netting from wear and damage.

Preferably, the dome of the cap is sized to accommodate a wide variety of netting mesh sizes.

Preferably, the stem cavity of the netting post cap has a large enough diameter to fit over the post's largest cross-sectional dimension and be able to easily rotate horizontally on top of the post prior to securing the preferred orientation. Additionally, the cavity in the stem of the netting post cap is sized to ensure the cap is sufficiently upright enough to keep from having the tension of the wires between posts and the tension in the netting pull the netting off of the netting post cap. Alternatively, the cavity can be shaped to match fence posts for affixing netting post cap orientation.

Preferably, the four protrusions above the dome of the netting post cap are sized and spaced to accommodate a range of netting mesh sizes.

Preferably, the height of the four protrusions above the dome of the netting post cap is sized to accommodate a range of wire gauges and multiple overlapping wires and a range of netting styles and gauges.

Preferably, the diameter and depth of the eyelets in the dome are sized to allow for easy threading of multiple wires of a range of wire gauges.

Preferably, the size of the recess in the dome of the netting post cap is sufficient to allow for stacking of multiple wires of a range of wire gauges.

Preferably, the struts on the side of the netting post cap are sized to provide strength and stability as well as provide tie down locations for wire ends.

DETAILED DESCRIPTION OF THE DRAWINGS

Figure 1:
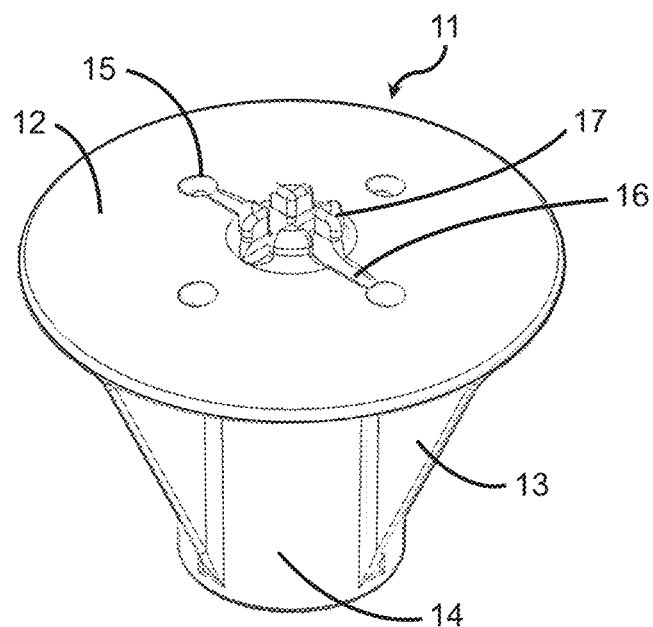
FIG. 1 is an isometric above perspective view of the netting post cap of the preferred embodiment.

Referring to FIG. 1, it will be apparent that the netting post cap 11 of a square polygonal configuration example of the preferred embodiment consists generally of a generally domed head 12 and a stem 14. The stem 14 may connect with the dome 12 with multiple struts 13 for structural support and for aiding in tying off wire ends. Holes 15 in the dome 12 are used to thread wire through and tie off wire ends. Protrusions 17 rising from the dome 12 are sized and shaped to match the desired netting polygonal configurations; typically square, but possibly rectangular, triangular, hexagonal, or even a custom netting mesh geometry. Multiple recesses 16 in the dome 12 may be applied to aid in aligning multiple wires including stacked crossing wires.

Figure 2:
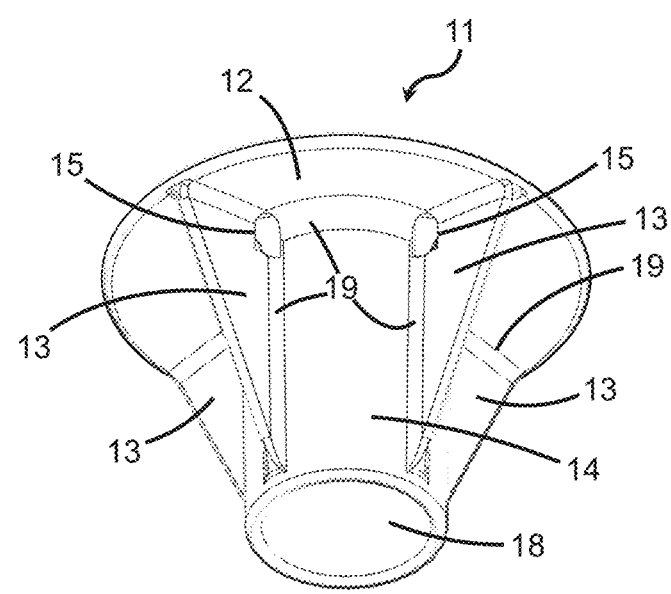
FIG. 2 is an isometric underneath perspective view of the netting post cap of the preferred embodiment.

Referring to FIG. 2, it will be apparent that the stem 14 has a cavity 18 that is used to slide over the top of the post 20. The size and shape of the cavity 14 may be adjusted to allow for free horizontal rotation or matched to the shape of the post top to affix horizontal orientation. The netting post cap 11 can be scaled to fit common post shapes such as "T-posts," "U-posts," round hollow posts, square hollow posts, and rectangular hollow posts. Similarly, the stem cavity 18 can be shaped to match the aforementioned common post shapes to provide the option of locking the horizontal orientation of the netting post cap 11. Fillets 19 may be used between the major elements of the netting post cap 11, including the dome 12, protrusions 17, struts 13, stem 14, and stem cavity 18 to minimize stress concentration points and to aid in threading wire through the holes 15.

Figure 3:
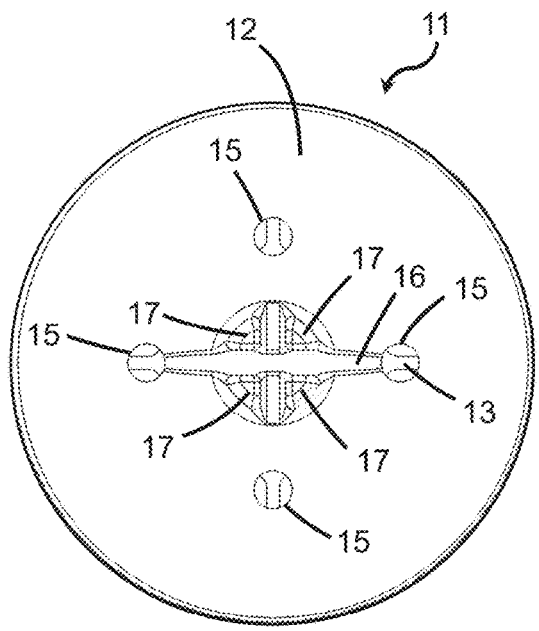
FIG. 3 is a top perspective view of the netting post cap of the preferred embodiment.

Referring to FIG. 3, it will be apparent that the preferred embodiment invention allows for holes 15 that pass through the dome 12 into the struts 13 to provide the ability to thread wire on either side of the struts 13 to aid in redirecting wire direction or in tying off wire ends.

Figure 4:
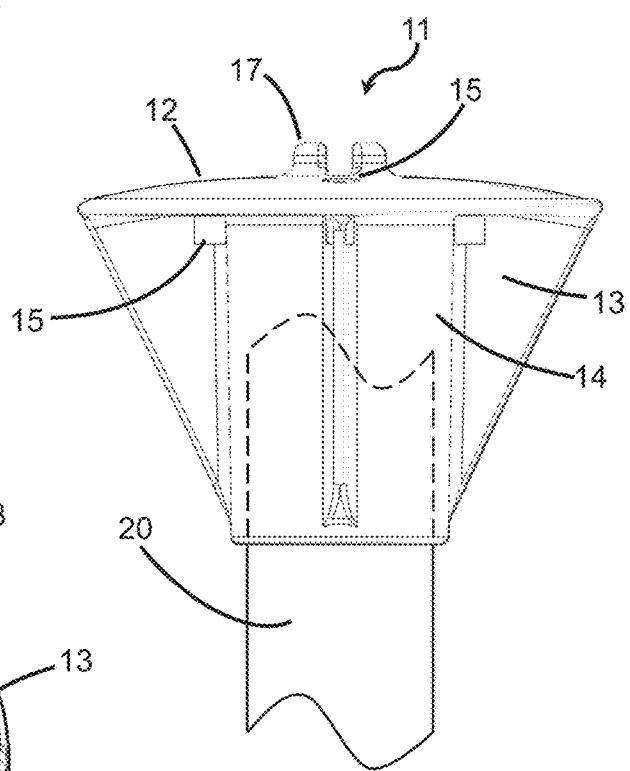
FIG. 4 is a side perspective view of the netting post cap of the preferred embodiment.

Referring to FIG. 4, it will be apparent that the depth of the holes 15 can be scaled and shaped to provide sufficient room for various wire diameters to aid in threading and positioning the wire.

Figure 5:
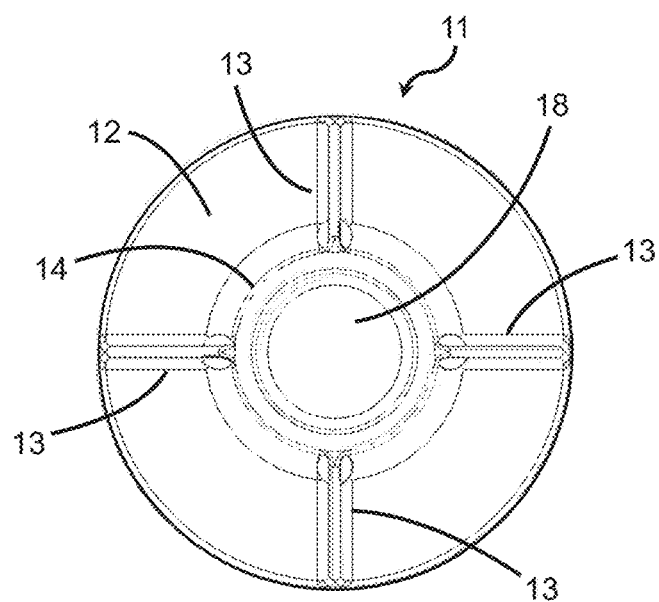
FIG. 5 is a bottom perspective view of the netting post cap of the preferred embodiment.

Referring to FIG. 5, it will be apparent that the preferred embodiment netting post cap 11 is round to allow for 360 degrees of netting support. The overall shape of the netting post cap 11 can be varied to provide options for 90 degrees, 180 degrees, or a custom angle netting support. Additionally, the overall dome 12 shape can be polygonal to provide customer selected netting support configurations.

These and other modifications will be apparent to persons skilled in the art which will be regarded as falling within the scope of the invention described herein.

The claims of the invention are as follows:

1. A netting post cap for a post, said netting post cap comprising:
   a. a generally domed head;
   b. a plurality of protrusions projecting upward from said domed head;
   c. a hollow stem connected to and under said domed head for fitting over and circumscribing said post, said stem having a slightly larger cross-section profile than a corresponding overall outline of said post; and
   d. said stem having at least one strut;
   e. wherein said domed head overlies and extends radially outward from said post when the hollow stem is fitted over and circumscribes said post.

2. The netting post cap of claim 1 wherein said plurality of upward protrusions are sized and shaped to support multiple netting mesh sizes and shapes to adequately secure and protect netting in use.

3. The netting post cap of claim 1 wherein said domed head has at least one recess, each recess being sized and shaped to support at least one wire therein.

4. The netting post cap of claim 1, said domed head having a plurality of holes defined therein, each hole being sized and shaped for easy threading of wire therethrough.

5. The netting post cap of claim 1 wherein said stem has a cavity that fits over said post, said cavity being sized and shaped to allow for horizontal orientation from 0 to 360 degrees as needed in use.

6. The netting post cap of claim 1 wherein said stem has a cavity that may be adapted for T-posts, U-posts, round posts, rectangular posts, and other polygonal posts.

7. A netting post cap for a post, said netting post cap comprising:
   a. a generally domed head;
   b. a plurality of protrusions projecting upward from said domed head;
   c. at least one hole defined in said domed head; and
   d. a hollow stem connected to and under said domed head, said stem having at least one strut;
   e. wherein said domed head overlies and extends radially outward from said post when the hollow stem is fitted over and circumscribes said post.

8. The netting post cap of claim 7 further comprising at least one path defined between at least two of said plurality of protrusions.

9. The netting post cap of claim 7 further comprising:
   a. at least one path defined between at least two of said plurality of protrusions; and
   b. said at least one hole positioned in line with said at least one path.

10. The netting post cap of claim 7 further comprising:
    a. at least one path defined between at least two of said plurality of protrusions;
    b. said at least one hole being a first hole defined in said domed head and a second hole defined in said domed head;
    c. said first hole and said second hole both positioned in line with said at least one path; and
    d. said plurality of protrusions positioned between said first hole and said second hole.

11. The netting post cap of claim 7 further comprising a plurality of paths defined between at least two of said plurality of protrusions, at least one of said plurality of paths having an elongated recess defined therein.

12. The netting post cap of claim 7, said at least one strut positioned on an outer surface of said stem and supporting said domed head.

13. The netting post cap of claim 7, said at least one hole defined in said domed head being a plurality of holes defined in said domed head, said at least one strut being a plurality of struts positioned on an outer surface of said stem and supporting said domed head, each hole positioned above one of said plurality of struts.

14. The netting post cap of claim 7 further comprising:
    a. a plurality of struts positioned on an outer surface of said stem and supporting said domed head;
    b. said at least one hole being a plurality of holes; and
    c. each hole positioned above one of said plurality of struts.

15. A netting post cap for a post, said netting post cap comprising:
    a. a head;
    b. a plurality of protrusions projecting upward from said head;
    c. a plurality of holes defined in said head;
    d. a hollow stem connected to and under said head; and
    e. at least one strut positioned on an outer surface of said stem and supporting said head;
    f. wherein said head overlies and extends radially outward from said post when the hollow stem is fitted over and circumscribes said post.

16. The netting post cap of claim 15 further comprising at least one path defined between at least two of said plurality of protrusions.

17. The netting post cap of claim 15 further comprising:
    a. said at least one strut being a plurality of struts; and
    b. each hole positioned above one of said plurality of struts.

18. The netting post cap of claim 15 further comprising:
    a. at least one path defined between at least two of said plurality of protrusions; and
    b. at least one hole of said plurality of holes positioned in line with said at least one path.

19. The netting post cap of claim 15 further comprising a plurality of paths defined between at least two of said plurality of protrusions, at least one of said plurality of paths having an elongated recess defined therein.

20. The netting post cap of claim 15, said plurality of protrusions positioned between at least two of said plurality of holes.

21. The netting post cap of claim 1, each strut positioned on an outer surface of said hollow stem just below said domed head.

22. The netting post cap of claim 1, each strut suitable for at least partially supporting said domed head.

23. The netting post cap of claim 1, each strut suitable for providing a tie down location for tying off wire ends.

24. The netting post cap of claim 1, said domed head having a plurality of holes defined therein, said plurality of protrusions positioned between at least two of said plurality of holes.

\* \* \* \* \*